United States Patent
Croak et al.

(10) Patent No.: US 8,130,934 B1
(45) Date of Patent: Mar. 6, 2012

(54) METHOD AND APPARATUS FOR PROVIDING NETWORK BASED MUTING OF CALL LEGS

(75) Inventors: Marian Croak, Fair Haven, NJ (US); Hossein Eslambolchi, Los Altos Hills, CA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1896 days.

(21) Appl. No.: 11/234,921

(22) Filed: Sep. 26, 2005

(51) Int. Cl.
*H04M 3/00* (2006.01)

(52) U.S. Cl. .................................. 379/265.01; 370/259

(58) Field of Classification Search .................. 370/259, 370/352; 379/219, 220.01, 88.13, 265.01–265.14
See application file for complete search history.

(56) References Cited

U.S. PATENT DOCUMENTS

| | | | | |
|---|---|---|---|---|
| 4,136,266 A * | 1/1979 | Cohen et al. | | 379/194 |
| 4,230,914 A * | 10/1980 | Korwin et al. | | 379/195 |
| 4,443,665 A * | 4/1984 | Alderman | | 379/194 |
| 4,726,048 A * | 2/1988 | Waldman et al. | | 379/7 |
| 4,941,166 A * | 7/1990 | Waldman et al. | | 379/67.1 |
| 5,195,087 A * | 3/1993 | Bennett et al. | | 370/264 |
| 5,231,658 A * | 7/1993 | Eftechiou | | 379/194 |
| 5,651,054 A * | 7/1997 | Dunn et al. | | 379/88.11 |
| 6,002,747 A * | 12/1999 | Eftechiou | | 379/35 |
| 6,160,877 A * | 12/2000 | Tatchell et al. | | 379/197 |
| 6,208,729 B1* | 3/2001 | Agraharam et al. | | 379/215.01 |
| 6,243,454 B1* | 6/2001 | Eslambolchi | | 379/202.01 |
| 6,735,193 B1* | 5/2004 | Bauer et al. | | 370/352 |
| 7,171,404 B2* | 1/2007 | Lindblad et al. | | 1/1 |
| 7,187,767 B2* | 3/2007 | Ghomeshi et al. | | 379/421 |
| 7,487,210 B2* | 2/2009 | Ludwig et al. | | 709/204 |
| 7,616,742 B2* | 11/2009 | Schoeneberger et al. | | 379/88.17 |
| 7,885,209 B1* | 2/2011 | Michaelis et al. | | 370/263 |
| 7,885,396 B2* | 2/2011 | Liang et al. | | 379/202.01 |
| 2002/0077157 A1* | 6/2002 | Okun et al. | | 455/567 |
| 2004/0208307 A1* | 10/2004 | Walker et al. | | 379/265.01 |
| 2004/0264653 A1* | 12/2004 | Revisky et al. | | 379/88.12 |
| 2005/0147212 A1* | 7/2005 | Benco et al. | | 379/84 |
| 2006/0098798 A1* | 5/2006 | Krasnansky | | 379/202.01 |
| 2006/0239257 A1* | 10/2006 | Banner et al. | | 370/356 |
| 2006/0245598 A1* | 11/2006 | Batai | | 381/74 |
| 2007/0003044 A1* | 1/2007 | Liang et al. | | 379/215.01 |
| 2007/0280464 A1* | 12/2007 | Hughes et al. | | 379/205.01 |

* cited by examiner

*Primary Examiner* — William Deane, Jr.

(57) ABSTRACT

A method and apparatus for enabling a network service to provide a call center with an option that allows calling customers to mute their conversation prior to a customer care representative is available to answer the call while the customer is being placed on hold waiting are disclosed. The customer selects the muting option by entering, e.g., a predefined Dual Tone Multiple Frequency (DTMF) signal provided in a network announcement. The present invention also enables a network capability to un-mute the call leg as soon as the customer care representative is available to answer the customer call.

20 Claims, 4 Drawing Sheets

200

300

METHOD AND APPARATUS FOR PROVIDING NETWORK BASED MUTING OF CALL LEGS

The present invention relates generally to communication networks and, more particularly, to a method and apparatus for enabling network based muting of call legs for call center monitoring in a communication network, e.g., a packet network such as a Voice over Internet Protocol (VoIP) network.

BACKGROUND OF THE INVENTION

To improve upon service quality, call centers typically monitor and record the conversations of a certain percentage of incoming calls from customers. When all available customer care representatives are busy helping other customers, incoming calls can be placed on hold until the next available customer care representative is able to answer the calls. However, monitoring and recording start as soon as the call is received by the call center and all activity is recorded even personal conversations that callers engage in while waiting in queue on hold. This can be invasive to the privacy of calling customers as well as an inefficient use of call center resources.

Therefore, a need exists for a method and apparatus for enabling network based muting of call legs in a packet network, e.g., a VoIP network.

SUMMARY OF THE INVENTION

In one embodiment, the present invention enables a network service to provide an enterprise customer, e.g., a call center with an option that allows calling customers to the call center to mute their conversation prior to a customer care representative is available to answer the call while the customer is being placed on hold waiting. The customer selects the muting option by entering a predefined Dual Tone Multiple Frequency (DTMF) signal provided in a network announcement. The present method also enables a network capability to un-mute the call leg as soon as the customer care representative is available to answer the customer call.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
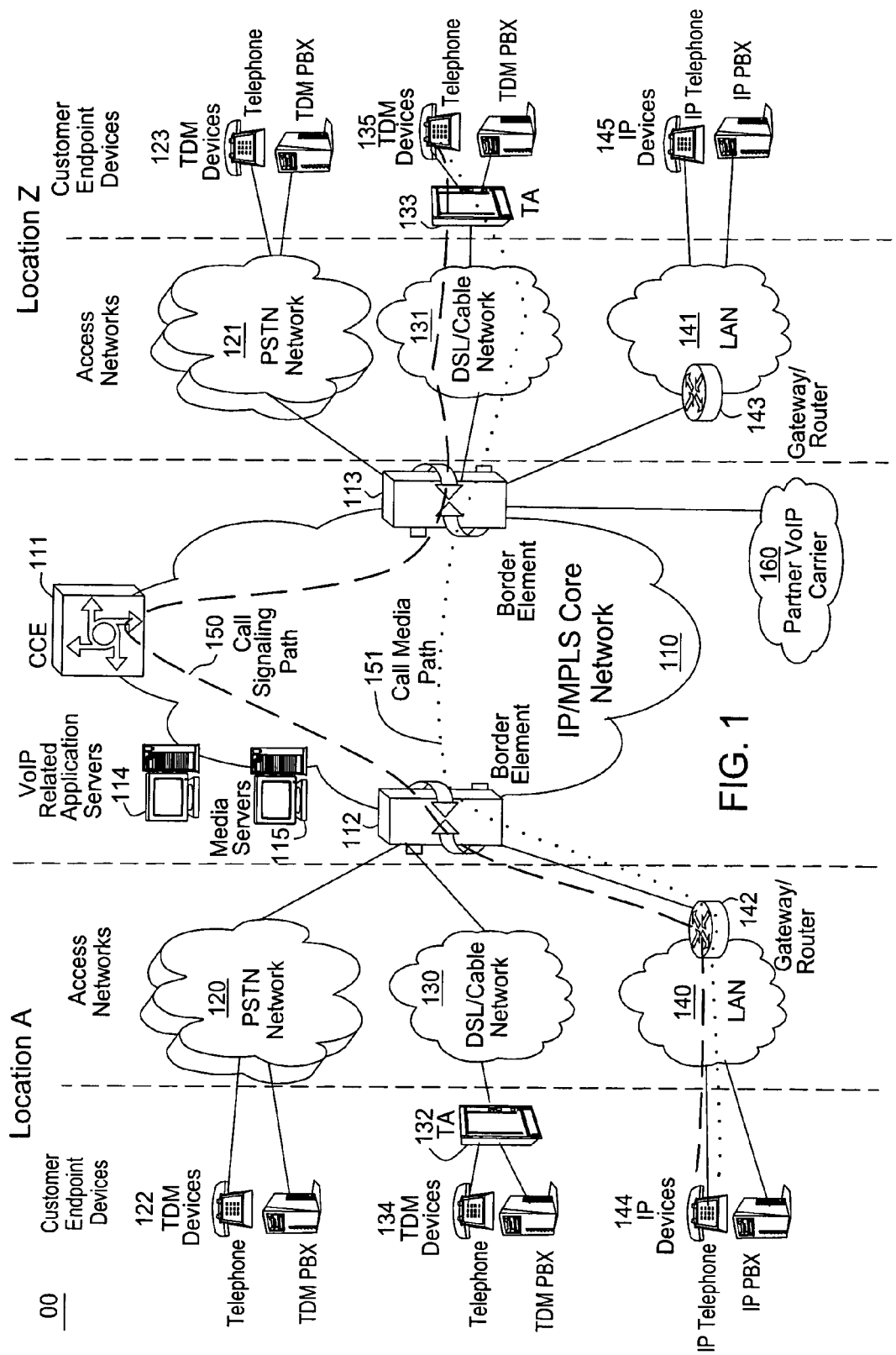
FIG. 1 illustrates an exemplary Voice over Internet Protocol (VoIP) network related to the present invention.

To better understand the present invention, FIG. 1 illustrates an example network 100, e.g., a packet network such as a VoIP network related to the present invention. Exemplary packet networks include internet protocol (IP) networks, asynchronous transfer mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted to be limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such the Border Element (BE) 112 and 113, the Call Control Element (CCE) 111, VoIP related Application Servers (AS) 114, and Media Server (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that require certain service specific features, e.g. translation of an E.164 voice network address into an IP address.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related application server 114 to obtain the information to complete this call. In one embodiment, the Application Server (AS) functions as a SIP back-to-back user agent. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP 200 OK response message if SIP is used, is sent in the reverse direction back to the CCE 111. After the CCE 111 receives the call acknowledgement message, it will then send a call acknowledgement signaling message, such as a SIP 200 OK response message if SIP is used, toward the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. Note that the call signaling path and the call media path are different because once a call has been setup up between two endpoints, the CCE 111 does not need to be in the data path for actual direct data exchange.

Media Servers (MS) 115 are special servers that typically handle and terminate media streams, and to provide services such as announcements, bridges, transcoding, and Interactive Voice Response (IVR) messages for VoIP service applications.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

To improve upon service quality, call centers typically monitor and record the conversations of a certain percentage of incoming calls from customers. When all available customer care representatives are busy helping other customers, incoming calls can be placed on hold until the next available customer care representative is able to answer the calls. However, monitoring and recording start as soon as the call is received by the call center and all activity is recorded even personal conversations that callers engage in while waiting in queue on hold. This can be invasive to the privacy of calling customers as well as an inefficient use of call center resources.

To address this criticality, the present invention enables a network service to provide an enterprise customer, e.g., a call center with an option that allows calling customers to mute their conversation prior to a customer care representative is available to answer the call while the customer is being placed on hold waiting. The customer selects the muting option by entering a predefined Dual Tone Multiple Frequency (DTMF) signal provided in a network announcement. The present invention also enables a network capability to un-mute the call leg as soon as the customer care representative is available to answer the customer call.

Figure 2:
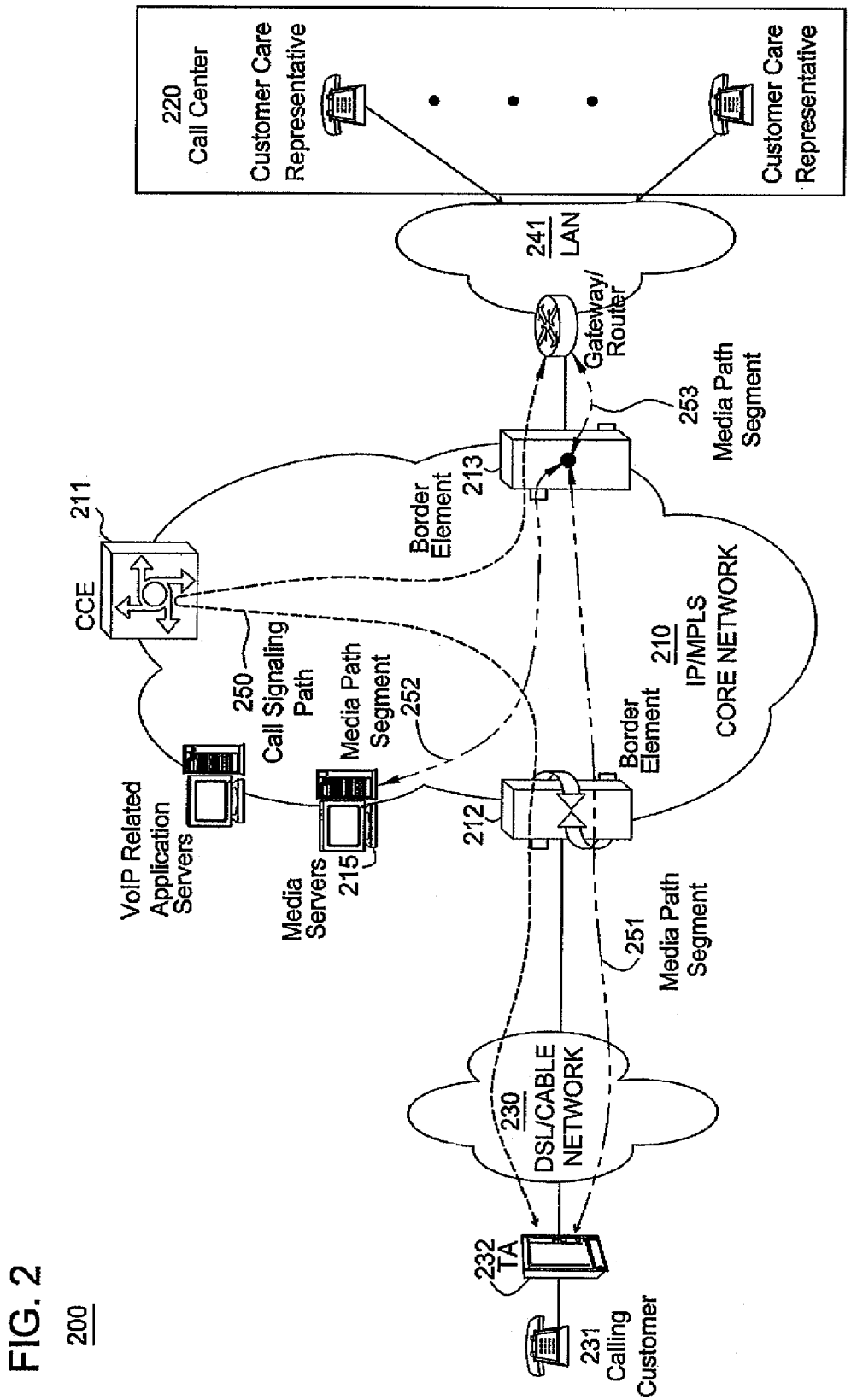
FIG. 2 illustrates an example of enabling network based muting of call legs for call center monitoring in a VoIP network related to the present invention.

FIG. 2 illustrates an exemplary communication architecture 200 for enabling network based muting of call legs for call center monitoring in a packet network 210, e.g., a VoIP network related to the present invention. In FIG. 2, customer 231 makes a call to call center 220 using signaling path 250 via TA 232, access network 230, BE 212, CCE 211, BE 213 and access network 241. The call is subsequently completed resulting in a call media path having been established. The established media path comprises media path segment 251 and media path segment 253. However, all available customer care representatives may be busy helping other customers and customer 231 is placed on hold waiting for the next available customer care representative. In the meantime, the monitoring and recording of incoming calls have already started. While on hold, a network announcement offering customer 231 the option to mute call leg associated with customer 231 in the direction from the network towards the call center 220 is made. The network announcement is sent by MS 215 to customer 231 by bridging media path segment 252 and media path segment 251 by BE 213. If the muting option offered by the network is accepted by the customer by entering a predefined DTMF signal, all conversation in the direction from the network towards the call center 220 associated with customer 231 will be muted. More specifically, all conversation in the direction from the network towards call center 220 over media path 253 will be muted so that personal conversations of customer 231 cannot be monitored or recorded by call center 220. Once the next available customer care representative is available to pick up the line to answer the call of customer 231, media path segment 253 that has been previously muted will be un-muted by the network to allow the conversation between customer 231 and the customer care representative to proceed as normal. In one embodiment, the un-muting operation does not require any action from the customer.

Figure 3:
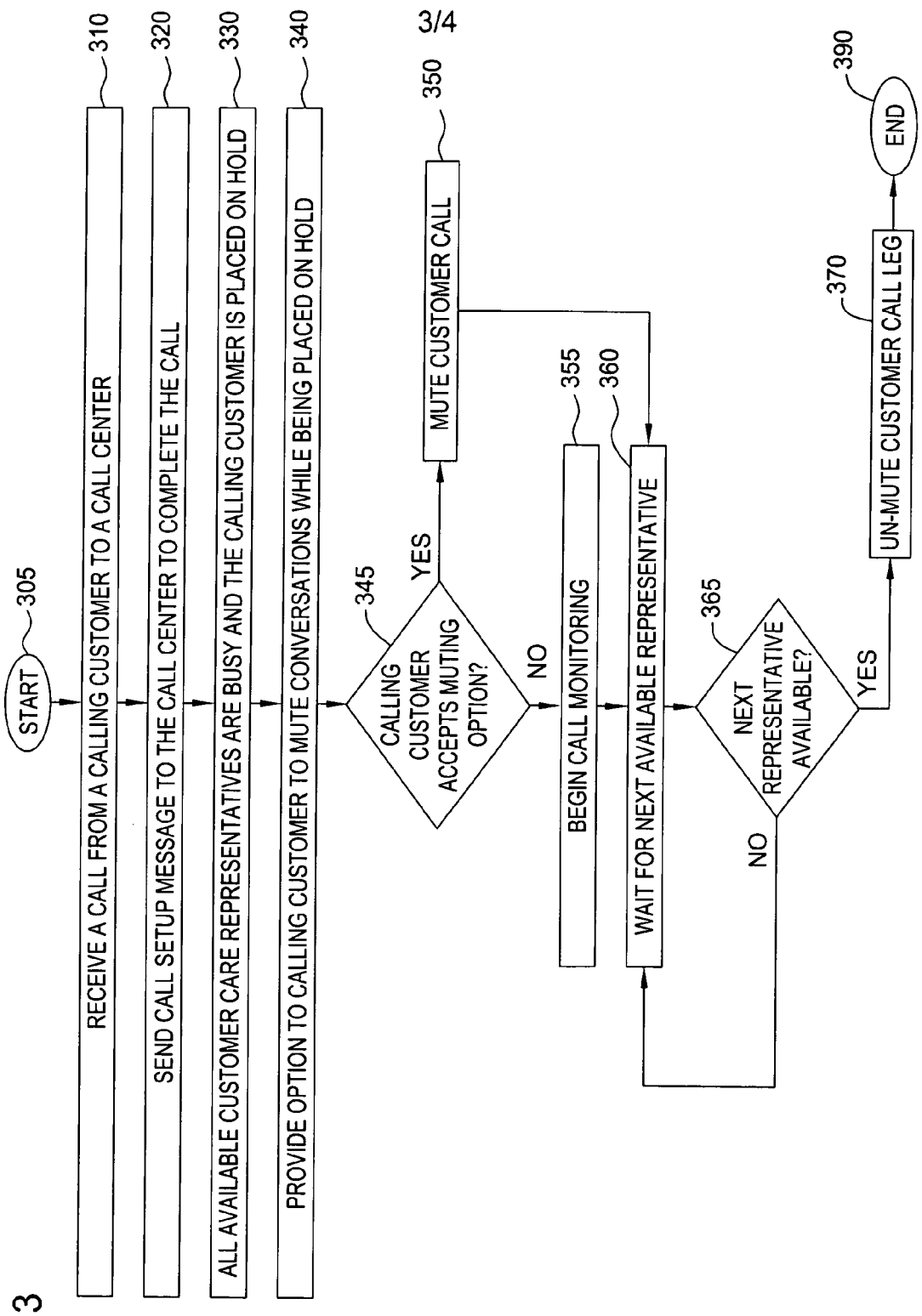
FIG. 3 illustrates a flowchart of a method for enabling network based muting of call legs for call center monitoring in a VoIP network of the present invention.

FIG. 3 illustrates a flowchart of a method 300 for providing network based muting of call legs for call center monitoring in a packet network, e.g., a VoIP network of the present invention. Method 300 starts in step 305 and proceeds to step 310.

In step 310, the method receives a call setup message from a caller destined to a location where recording of the call is possible, e.g., the call is destined to a call center. A call center is broadly defined to a center where a plurality of agents is available to assist customers. However, the present invention is not limited to a call center. Namely, the present invention can be deployed in any location where calls are expected to be recorded.

In step 320, the method sends the call setup message to the call center to establish the call. Media path associated with the call is also established as a result of the call setup being completed.

In step 330, the method places the call on hold due to all available customer care representatives are busy helping other customers. Generally, a prerecorded network announcement is sent to inform the caller that he or she will be placed on hold due to high call volume.

In step 340, the method sends a network announcement to the caller to offer an option to mute all conversation associated with the caller while the caller is being placed on hold. The option will include instructions, e.g., a predefined DTMF signal that will activate the muting function.

In step 345, the method checks if the caller accepts the muting option offer by entering a predefined DTMF signal. If the muting offer is accepted, the method proceeds to step 350; otherwise, the method proceeds to step 355. In step 350, the method mutes the call in the direction from the network towards the call center.

In step 355, the method begins call monitoring by recording all conversations from the caller on hold.

In step 360, the method waits for the next available customer care representative to pick up the line to answer the call.

In step 365, the method checks if the next customer care representative is available. If the next customer care representative is available to pick up the line on hold, the method proceeds to step 370; otherwise, the method proceeds back to step 365.

In step 370, the method un-mute the customer call that has been previously muted and begins call monitoring and recording if it has not previously started. In one embodiment, the call is un-muted when a customer agent picks up the call. Thus, there is no action that will be needed from the customer to un-mute the call when the customer agent begins to address the customer. The method ends in step 390.

Figure 4:
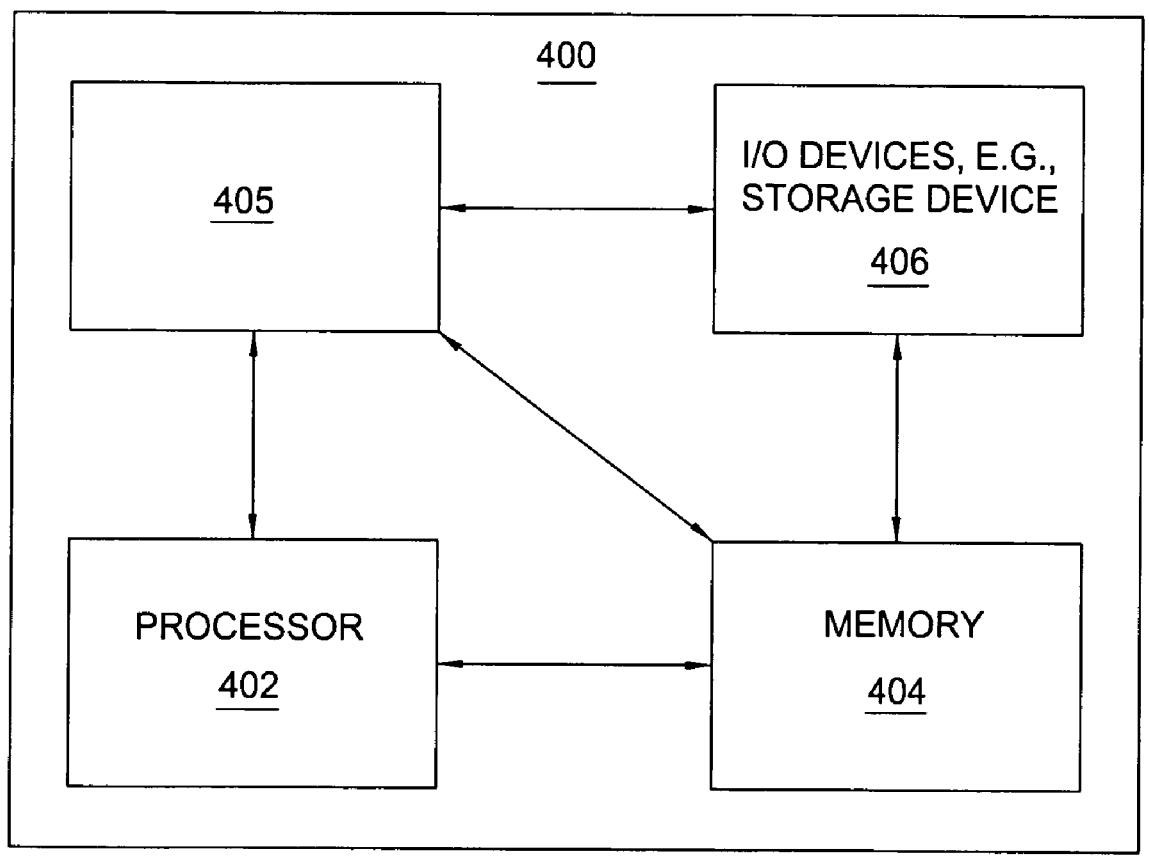
FIG. 4 illustrates a high level block diagram of a general purpose computer suitable for use in performing the functions described herein.

FIG. 4 depicts a high level block diagram 400 of a general purpose computer suitable for use in performing the functions described herein. As depicted in FIG. 4, the system 400 comprises a processor element 402 (e.g., a CPU), a memory 404, e.g., random access memory (RAM) and/or read only memory (ROM), a network based muting module 405, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present network based muting module or process 405 can be loaded into memory 404 and executed by processor 402 to implement the functions as discussed above. As such, the present network based muting process 405 (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing a network based muting of a call leg in a communication network, comprising:

receiving a call via a processor from a caller destined to a call center;

establishing a call media path between the caller and the call center;

determining that the call will be placed on hold; and offering the caller an option to mute the call, where the option to mute, if activated, will mute a call leg of the call media path supporting the call.

2. The method of claim 1, wherein the communication network is an internet protocol network.

3. The method of claim 1, further comprising:

placing the caller on hold to wait for a next available customer agent.

4. The method of claim 1, wherein the offering comprises:

sending a network announcement by the communication network to the caller to present the caller with an option to mute the call; and muting the call leg of the call media path in a direction from the communication network to the call center, if the caller accepts the option to mute.

5. The method of claim 4, wherein the network announcement is sent by a media server.

6. The method of claim 4, wherein the call is muted by a border element.

7. The method of claim 1, further comprising:

un-muting the call automatically when a customer agent is available to speak to the caller.

8. A non-transitory computer-readable medium having stored thereon a plurality of instructions, the plurality of instructions including instructions which, when executed by a processor, cause the processor to perform a method for providing a network based muting of a call leg in a communication network, comprising:

receiving a call from a caller destined to a call center;

establishing a call media path between the caller and the call center;

determining that the call will be placed on hold; and offering the caller an option to mute the call, where the option to mute, if activated, will mute a call leg of the call media path supporting the call.

9. The non-transitory computer-readable medium of claim 8, wherein the communication network is an Internet protocol network.

10. The non-transitory computer-readable medium of claim 8, further comprising:

placing the caller on hold to wait for a next available customer agent.

11. The non-transitory computer-readable medium of claim 8, wherein the offering comprises:

sending a network announcement by the communication network to the caller to present the caller with an option to mute the call; and muting the call leg of the call media path in a direction from the communication network to the call center, if the caller accepts the option to mute.

12. The non-transitory computer-readable medium of claim 11, wherein the network announcement is sent by a media server.

13. The non-transitory computer-readable medium of claim 11, wherein the call is muted by a border element.

14. The non-transitory computer-readable medium of claim 8, further comprising:

un-muting the call automatically when a customer agent is available to speak to the caller.

15. An apparatus for providing a network based muting of a call leg in a communication network, comprising:

means for receiving a call from a caller destined to a call center;

means for establishing a call media path between the caller and the call center;

means for determining that the call will be placed on hold; and means for offering the caller an option to mute the call, where the option to mute, if activated, will mute a call leg of the call media path supporting the call.

16. The apparatus of claim 15, wherein the communication network is an internet protocol network.

17. The apparatus of claim 15, further comprising:

means for placing the caller on hold to wait for a next available customer agent.

18. The apparatus of claim 15, wherein the offering means comprises:

means for sending a network announcement by the communication network to the caller to present the caller with an option to mute the call; and means for muting the call leg of the call media path in a direction from the communication network to the call center, if the caller accepts the option to mute.

19. The apparatus of claim 18, wherein the call is muted by a border element.

20. The apparatus of claim 15, further comprising:

means for un-muting the call automatically when a customer agent is available to speak to the caller.

* * * * *